United States Patent [19]

Cogswell et al.

[11] 4,352,927

[45] Oct. 5, 1982

[54] METHOD OF IMPROVING PROCESSABILITY OF RIGID POLYMERS

[75] Inventors: Frederic N. Cogswell, Welwyn Garden City; Jiri G. Tomka, Harrogate, both of England

[73] Assignee: Imperial Chemical Industries Limited, London, England

[21] Appl. No.: 40,452

[22] Filed: May 18, 1979

[30] Foreign Application Priority Data

May 26, 1978 [GB] United Kingdom ............... 22953/78
May 26, 1978 [GB] United Kingdom ............... 22954/78

[51] Int. Cl.³ ...................... C08G 69/46; C08G 73/10; C08G 73/18
[52] U.S. Cl. .................................... 528/502; 528/480; 528/348; 528/353; 528/363
[58] Field of Search ............... 528/353, 502, 480, 348, 528/363; 525/420

[56] References Cited

U.S. PATENT DOCUMENTS

| | | | |
|---|---|---|---|
| 3,428,602 | 2/1969 | Haller | 528/353 |
| 3,631,017 | 12/1971 | Rettig et al. | 528/502 |
| 3,671,542 | 6/1972 | Kwolek | 260/30.8 R |
| 3,732,349 | 5/1973 | Chen et al. | 528/502 |
| 4,093,692 | 6/1978 | Hill | 264/95 |

FOREIGN PATENT DOCUMENTS 1507207  4/1978  United Kingdom .

OTHER PUBLICATIONS

Freelance Translation–Plaste u Kautschuk, 22, 12, 1975, pp. 970–975.
Freelance Translation–Belgian Patent 511,763, published 18 Dec. 1953.

*Primary Examiner*—Harold D. Anderson
*Attorney, Agent, or Firm*—Cushman, Darby & Cushman

[57] ABSTRACT

A method of improving the processability of rigid polymers, particularly of unprocessable rigid polymers, wherein the rigid polymer in melt or solution form is subjected to an apparent shear rate between relatively moving surfaces of at least 100 sec$^{-1}$, particularly between 100 and 1000 sec$^{-1}$. The method reduces the viscosity of the melt or solution and when the melt or solution is fabricated into shaped articles while the viscosity is so reduced the shaped articles have improved properties, particularly more uniform orientation when compared with products prepared by methods which do not include the pre-shearing step prior to fabrication.

11 Claims, 1 Drawing Figure

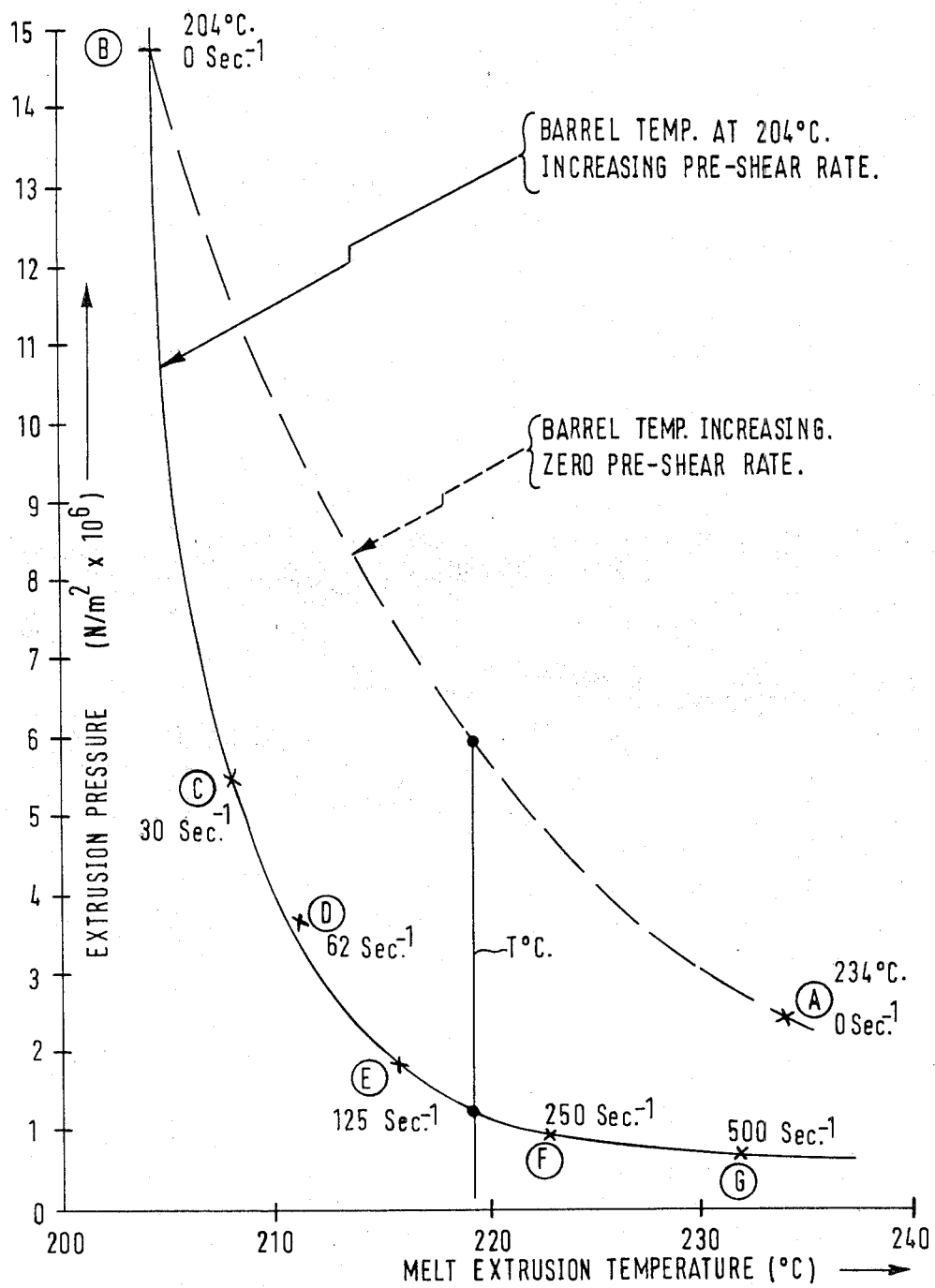

METHOD OF IMPROVING PROCESSABILITY OF RIGID POLYMERS

The present invention relates to a method of improving the processability of so-called rigid or stiff polymers to render them processable (as hereinafter defined). The invention is applicable to melts or solutions of the rigid polymers.

Some rigid-or-stiff polymers show a liquid crystal behaviour in the molten state. "Thermotropic" liquid crystal behaviour has been described in respect of molten materials as being that which manifests itself within a particular temperature range. Additionally, for solutions of some rigid polymers two types of system which show liquid crystal behaviour have been described; one which requires a critical mixture to show such behaviour (called "lyotropic") and another which requires a particular temperature range, as in the case of the molten materials, (called "thermotropic"). Some rigid-polymers can form solutions which exhibit both types of behaviour.

Within its particular thermotropic temperature range, a rigid-polymer which is capable of showing thermotropic liquid crystal behaviour in the molten state will do so naturally, to yield a low viscosity melt which is readily extrudable with good inherent properties. Similarly, when showing natural liquid crystal behaviour, rigid-polymer dopes are low viscosity, highly mobile liquids capable of being readily extruded at high concentrations and with good inherent properties. These low viscosity melts and solutions of the rigid polymer are defined herein as "processable".

Outside the physical bounds within which liquid crystal behaviour can be said to occur naturally, rigid-polymer melts or solutions cannot be fabricated into useful articles. The solutions or dopes are generally immobile, and tend to exhibit either a rubber-like consistency or a friable paste-like consistency. As such they are not readily extrudable, but if extruded result in grossly distorted and/or discontinuous extrudates. The melts will generally have a much higher viscosity (than in the liquid crystal form) and exhibit a yield stress. They will not be readily extrudable. If extruded they will give distorted and discontinuous extrudates. Such polymer solutions and melts are defined herein as "unprocessable".

Apart from the physical conditions which determine whether rigid-polymer solutions and melts naturally show liquid crystal behaviour, modifications to the chemical structure of such polymers, for example, by introducing less rigid, i.e. flexible, chain segments, may prevent the occurrence of natural liquid crystal behaviour. Such modified polymer solutions and melts are also defined herein as "unprocessable".

A method has now been found of converting "unprocessable" melts or solutions into "processable" melts or solutions. The method also enables the processability of melts or solutions which are already "processable" as hereinbefore defined to be improved.

Accordingly there is provided a method of improving the processability of rigid polymers characterised in that a melt or solution of the polymer is subjected to shear between relatively moving surfaces at an apparent shear rate of at least 100 sec$^{-1}$.

In the case where the melt or solution of the rigid polymer is unprocessable the present invention provides a method of rendering processable, an unprocessable rigid-polymer comprising subjecting a melt or solution of the polymer to shear between relatively moving surfaces at an apparent shear rate of at least 100 sec$^{-1}$.

This behaviour under mechanical treatment of rigid-or-stiff-polymers to improve their processability by the application of shear is termed "rheotropic" and is believed to indicate a dependence of liquid crystal behaviour on the mechanical history of the melt or solution.

This induction of rheotropic behaviour is useful not only for rendering previously unprocessable rigid polymers processable but may be used to improve the processability of rigid polymers which are already processable by known techniques. In this case the improvement resulting from the process of the invention is likely to result in a much more robust process, that is, one which is much less likely to be affected by stray variations in processing conditions, but more importantly is likely to give rise to improved fabricated products because the shear process will improve the inhomogeneity of the melt and allow products of improved uniformity of orientation to be produced. Further processing advantages can be achieved through the ability to reduce the viscosity because although extrusion and processing of rigid polymers may be possible at high temperatures the reduction in viscosity achievable will enable the processing to be performed at a reduced temperature with consequent reduction in the risk of degradation of the polymer.

Furthermore, in addition to providing a method for processing rigid polymers outside the range of physical conditions under which the rigid polymers naturally exhibit liquid crystal behaviour, the method is useful for inducing liquid crystal behaviour in some rigid polymers which are otherwise incapable of exhibiting liquid crystal behaviour. For example, whereas solutions of paraphenylene terephthalamide or copolymers thereof containing less than 5% aliphatic units are readily capable of showing liquid crystal behaviour homopolymers and copolymers of poly (para-phenylene oxadiazoles) are not quite capable of naturally exhibiting liquid crystal behaviour. They may, however, be induced to do so by use of the present invention.

The improvement in processability obtainable by the method of the invention will only exist for a relatively short period after the shearing has ceased.

Accordingly there is also provided a method of fabricating a shaped article from a rigid polymer characterised in that a melt or solution of the rigid polymer has its viscosity reduced by shearing between relatively moving surfaces at an apparent shear rate of at least 100 sec$^{-1}$ and a shaped article is fabricated from the melt or solution while the viscosity is so reduced. In the case of a rigid polymer melt or solution which is unprocessable prior to the application of shear the viscosity should be reduced to a level at which it becomes processable and the article should be fabricated whilst the viscosity is so reduced.

Ideally, the viscosity reduced from the rigid polymer should be fabricated as quickly as possible after the shearing operation. The time interval before the viscosity reverts to its original pre-sheared level (hereinafter termed the "relaxation period") is dependent on the nature of the rigid polymer and the reduction in viscosity which has been achieved by shearing. Typical relaxation periods are as little as 1 second or as much as 10000 seconds but are normally in the range 10–100 seconds.

In a further aspect of the invention there is provided a process for fabricating a rigid polymer which is capable of exhibiting a liquid crystal behaviour while in the form of a melt or solution within a particular temperature range, wherein said melt or solution is sheared between relatively moving surfaces at a shear rate of at least 100 sec$^{-1}$ at a temperature outside the particular temperature range to induce a liquid crystal behaviour and then fabricating the melt or solution whilst it is exhibiting the liquid crystal behaviour.

After the melts or solutions have been converted into more readily processable forms they may be fabricated by normal techniques know to those skilled in the art. The preferred process of fabrication is extrusion.

Rigid polymers suitable for use in the invention generally have a formula

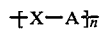

wherein

'X' is an aromatic radical, which may be substituted (i.e. brominated), having outgoing bonds which are either colinear (e.g. para-phenylene) or parallel (e.g. 2,6-naphthylene); and 'A' represents either an atom or a group of atoms, and assumes a configuration wherein its outgoing bonds are either parallel or form at angle $\theta$ thus:

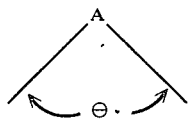

where $\theta$ is at least 120° (and does not exceed 180°).

From 5 to 15 mole %, and in certain cases up to 30 mole %, of the X radicals may be replaced by other radicals (e.g. meta-phenylene) whose outgoing bonds do not meet the above criterion. These latter radicals may be distributed randomly along the chain, or grouped in adjacent repeat units as in block copolymers.

The group A may be a ring as in the case of polyparaphenylene-1,3,4-oxadiazoles, wherein the angle $\theta$ of the outgoing bonds is approximately 144° (TSVETKOV V N: Vysokomolek Soed 19 A (No. 10) page 2171, 1977).

Typically, the rigid polymers for use in the invention as solutions will have glass-rubber transition temperatures of at least 100° C., and preferably above 200° C., and an inherent viscosity of at least 1 dl/g, preferably of 2 dl/g or more.

At high concentrations and molecular weights it is possible to render processable solutions of rigid polymers which, though meeting the typical conditions set out, do not meet the formula (1). An example of such a polymer is polymethyl methacrylate.

In solution, at low concentrations, the typical rigid-polymers described will anyhow yield mobile liquid dopes. These are not economically processable and may not derive any benefit from the method of the invention. It is preferred that polymer concentration should be at least 7% wt/wt and preferably greater than 15% wt/wt. For any rigid-polymer dope, however, the preferred concentration will be dependent upon such variables as glass-rubber transition temperature, molecular weight, temperature and nature of the solvent. Desirably, these variables should be combined so as to provide dopes with a rubber-like consistency with apparent viscosities of at least 1000 Ns/m$^2$ and dopes with a paste-like consistency with yield stresses in the range $10^3$ to $10^5$ N/m$^2$.

When the method of the invention is applied to polymer melts typical rigid polymers will have a glass-rubber transition temperature of at least 60° C., preferably above 100° C., and an intrinsic viscosity of at least 0.25 dl/g, preferably at least 1.0 dl/g. In the "unprocessable" state the rigid-polymer melts generally show yield stresses in the range $10^3$ to $10^5$ N/m$^2$. Whether the rigid polymer is used in melt or solution form the apparent shear rate applied prior to processing (i.e. apparent pre-shear rate) is preferably in the range 100 to 1000 secs$^{-1}$, preferably 200 to 1000 secs$^-$, and desirably in the range 250 to 500 secs$^{-1}$. The apparent shear rate chosen will depend upon the nature of the rigid-polymer and its melt or solution.

The shearing is effected by passing the melt or solution between relatively moving surfaces, preferably between the relatively moving surfaces of cylinders, cones or discs. A typically suitable apparatus of this type utilises a rotatable cylindrical bob inside a concentric, stationary cylinder. Such an apparatus has been described by Hanson (Poly Eng Sci 9 No. 6 pages 405-414 November 1969). If required, the zone in which the shearing occurs may be heated or cooled.

This apparatus enables the effects of pre-shearing rate, relaxation period and extrusion shear rate to be examined. The time spent by the rigid polymer solution or melt undergoing shear, relaxation and extrusion is determined by the volume flow rate through the ram extruder which determines the apparent shear rate in the die. In the examples of the present invention the results were obtained using an apparatus according to Hanson comprising a ram extruder with a barrel of diameter 22.6 mm, the lower part of the barrel being fitted with a rotatable bob. The bob diameter was 19 mm and its length 20 mm. An extrusion die situated below the bob had a diameter of 2 mm and a length of 47 mm.

For this particular apparatus a volume flow rate which gives an apparent shear rate in the die of 50 sec$^{-1}$ gives corresponding dwell times in the pre-shear and relaxation zones of 60 secs in each zone. When the volume flow rate is increased to give an apparent shear rate in the die of 500 sec$^{-1}$ the dwell times in the pre-shear and relaxation zones are both 6 seconds.

The method of the present invention allows for the ready processing of melts or solutions of rigid-polymers in a condition which enables beneficial use of the good inherent properties of the polymers. It allows for their ready extrusion into shaped articles in such processes as filament spinning, film casting, and injection moulding.

Unless specifically stated, any reference to "viscosity" as used herein, is meant to imply "apparent viscosity". Thus, the apparent viscosity of a melt or solution is calculated from the rate of throughput through a capillary and the pressure required for that rate of throughput, viz:

$$\text{Apparent Viscosity (Ns/m}^2) = \frac{\text{Shear Stress}}{\text{Apparent Shear Rate}}$$

and $$\text{Shear Stress} = \frac{Pa}{2l}$$

where
P = the pressure drop along the capillary (N/m$^2$)
a = the radius of the capillary (m)
l = the length of the capillary (m)
and
Apparent Shear Rate (measured at the wall of the capillary $$= \frac{4Q}{\pi a 3}$$

where
Q = the throughput (m$^3$/sec)
a = the radius of the capillary (m).

The capillary may be constituted, for example, by an extrusion die or a spinneret hole.

In the case of the dopes or solutions the inherent viscosity as used herein is defined as:

$$\eta_{inh} = \frac{\ln (\eta_{rel})}{(C)}$$

where C is concentration (viz, 0.5 g of polymer per 100 ml of solution) and $\eta_{rel}$ is the ratio between the flow times of the polymer solution and solvent (98% sulphuric acid) as measured at 25° C. in a capillary viscometer.

In the case of polymers used in the melt form the intrinsic viscosity as used herein is defined as $$[\eta] = \left[ \frac{(\eta_{rel} - 1)}{C} \right]_{C \to 0}$$

where C is the concentration in grams per 100 ml solution and rel is the ratio between the flow times of the polymer solution and solvent as measured at 25° C. in a capillary viscometer.

The invention will be further described with reference to the following examples in which Examples 1-7 illustrate the application of the invention to solutions or dopes and Examples 8-10 illustrate its application to melts.

EXAMPLE 1

Terephthalic acid (1661 parts) and hydrazine sulphate (1320.5 parts) were charged into a stainless steel planatex mixer (manufactured by Beken) equipped with a reflux condenser having a silica gel guard tube. Oleum (4234 parts) of 65% strength was added whilst agitating, the temperature being kept at 20°-25° C. by external cooling. On completion of the addition of the oleum, the mixture was heated up to 60° C. over 20 minutes, held at this temperature for 5 minutes, and then heated up to 115° C. over the next 60 minutes. The mixture was maintained at 115°-120° C. for 90 minutes, with agitation taking place, and was then allowed to cool also whilst being agitated. The final solution of the oxadiazole polymer which contained 20% by weight of the polymer of inherent viscosity 2.5 dl/g, was a solid grey mass at ambient temperature. A thin section cut from this solid mass was optically anistropic at ambient temperature and remained so for at least one hour.

The solid mass was cut up and the pieces charged into the barrel of a ram extruder heated to a temperature of 50° C. and extruded through a die having a diameter of 2 mm and a length of 32 mm. The apparent viscosity of the polyoxadiazole solution, as calculated, was extremely high, as shown in the following table:

| Shear Rate in the Die (Sec$^{-1}$) | Apparent Viscosity (Ns/m$^2$) |
| --- | --- |
| 5 | 1.4 × 10$^5$ |
| 10 | 6.8 × 10$^4$ |
| 15 | 3.9 × 10$^4$ |
| 20 | 3.9 × 10$^4$ |
| 40 | 2.3 × 10$^4$ |

The extrudate in all cases was grossly distorted. Extrusion of the solution was repeated at temperatures in the ram extruder of 80° C., 100° C. and 120° C. The viscosity was reduced by a factor of about 50% but the extrudate quality remained poor and fibres could not be formed. At higher temperatures the solution showed a marked tendency to degrade.

The polymer did not exhibit a glass-rubber transition temperature below 440° C.

EXAMPLE 2

The solution or dope according to Example 1 was charged into the barrel of a ram extruder hereinbefore described with reference to the paper by D E Hanson (Polymer Eng Sci 9 page 406, November 1969). The dimensions of the ram extruder and the rotatable bob have been described above. The bob was rotated at 400 revolutions per minute (rpm). The dope moving through the annular gap between the wall of the barrel and the rotating bob was subjected to shear at a shear rate of 250 sec$^{-1}$. The average duration of this shearing depended on the throughput rate of the dope.

The effect of the shear prior to extrusion through the die on the polyoxadiazole dope is given in the following table:

| Duration of Pre-shear at Rate of 250$^{-1}$ (seconds) | Shear Rate in the Die (Sec$^{-1}$) | Apparent Viscosity (Ns/m$^2$) |
| --- | --- | --- |
| 296 | 10 | 2.4 × 10$^3$ |
| 148 | 20 | 2.1 × 10$^3$ |
| 74 | 40 | 1.7 × 10$^3$ |

The dope became a mobile liquid as a result of the pre-shear treatment and, when extruded, the extrudate was smooth and could easily be formed into fibres.

EXAMPLE 3

A polyoxadiazole solution was made in accordance with the process described in Example 1 at various solution concentrations and polymer inherent viscosities. The various samples were treated in accordance with Example 2 at a ram extruder temperature of 50° C., and apparent viscosity in the die of 1000 sec$^{-1}$, and with and without pre-shear. The results are given in the following table:

| Sample No. | Concentration % wt. | Inherent Viscosity | Apparent Viscosity (Ns/m$^2$) | |
| --- | --- | --- | --- | --- |
| | | | Zero Pre-shear | 500 sec$^{-1}$ Pre-shear |
| a | 7.5 | 3.2 | 38 | 33 |
| b | 7.5 | 4.8 | 75 | 30 |
| c | 7.5 | 4.8 | 75 | 25 |
| d | 15 | 2.5 | 400 | 210 |
| e | 15 | 3.5 | 700 | 140 |

-continued

| Sample No. | Concentration % wt. | Inherent Viscosity | Apparent Viscosity (Ns/m$^2$) | |
|---|---|---|---|---|
| | | | Zero Pre-shear | 500 sec$^{-1}$ Pre-shear |
| f | 20 | 0.85 | 80 | 80 |
| g | 20 | 1.05 | 90 | 90 |
| h | 20 | 1.25 | 100 | 100 |
| i | 20 | 2.39 | 500 | 400 |
| j | 20 | 2.50 | 1000 | 250 |

In respect of this polymer, these results enable a critical inherent viscosity to be estimated for different solutions to achieve ease of processability, viz:

| Concentration | Inherent Viscosity |
|---|---|
| 7.5 | 4.0 |
| 15 | 3.0 |
| 20 | 2.5 |

The inherent viscosity of each sample was measured before and after pre-shearing with no significant change.

EXAMPLE 4

A 20% wt solution of poly paraphenylene terephthalamide in concentrated sulphuric acid, made in accordance with the general teaching in U.K. Patent Specification No. 1 283 064, and having an inherent viscosity of 5.34 was discharged at a temperature of 85° C. through a 0.379 mm diameter, 0.904 mm long, die at an apparent shear rate of 250,000 sec$^{-1}$ with an apparent viscosity of 4 Ns/m$^2$.

When subjected to a pre-shear of 2000 sec$^{-1}$ prior to extrusion through the die, the viscosity of the solution remained unchanged.

On standing for 16 hours at 85° C., the solution changed from a mobile liquid to a friable paste. A sample of this paste was discharged through the above die, without pre-shear, under a pressure of 9.2×10$^6$ N/m$^2$ at an apparent shear rate of 7200 sec$^{-1}$ with an apparent viscosity of 140 Ns/m$^2$. The extrudate was an opaque friable paste which could not be formed into fibres. The lowest pressure at which the solution could be extruded was 5×10$^6$ N/m$^2$ indicating an apparent yield stress for the paste in excess of 10$^5$ N/m$^2$. The inherent viscosity of this polymer after the heat treatment was found to be 5.41.

Another sample of the paste was pre-sheared at a rate of 200 sec$^{-1}$ in an apparatus similar to that described in Example 2 and then extruded through the above die under a pressure of 9.2×10$^6$ N/m$^2$ at an apparent shear rate of 250000 sec$^{-1}$ yielding a mobile liquid with an apparent viscosity of 4 Ns/m$^2$ (identical to that of the original solution). The inherent viscosity of this sample after pre-shearing was found to be 5.34.

The effect of the preshear of 200 sec$^{-1}$ between relatively moving surfaces is clearly much greater in its effect than the shear rate of extrusion through the die of 7200 sec$^{-1}$.

EXAMPLE 5

A 90/10 mole % paraphenylene-/metaphenyleneterephthalamide block copolymer with an inherent viscosity of 5.0 was dissolved at 20% wt/wt in sulphuric acid. The composition was a paste with a consistency simmilar to toothpaste. It did not melt at any temperature up to 95° C. It exhibited a yield stress of about 10$^5$ N/m$^2$. Under an extrusion pressure of 5.7×10$^6$ N/m$^2$ a sample could be forced through a die, as described in Example 4, to give an apparent viscosity of 100 Ns/m$^2$ (similar to that observed for the heat treated sample of homopolymer in Example 4). The extrudate was friable and would not form fibres. Other samples were subjected to various pre-shear rates before extrusion through the die with the following results:

| Pre-shear Rate (sec$^{-1}$) | Pressure Drop through Die (N/m$^2$) | Apparent Viscosity (Ns/m$^2$) |
|---|---|---|
| 0 | 5.7 × 10$^6$ | 100 |
| 400 | 5.7 × 10$^6$ | 100 |
| 600 | 5.7 × 10$^6$ | 19 |
| 800 | 5.7 × 10$^6$ | 7 |

These results show that for this copolymer dope or solution a critical apparent pre-shear rate of 600 sec$^{-1}$ is required to achieve a mobile liquid capable of forming fibres.

A 90/10 mole % block copolymer, as above, but at 15% wt/wt concentration in solution in sulphuric acid, resulted in a dope which was a mobile liquid which could be readily extruded to form fibres. The effect of pre-shear on this dope was as follows:

| Pre-shear (sec$^{-1}$) | Apparent Viscosity (Ns/m$^2$) |
|---|---|
| 0 | 2.2 |
| 200 | 1.2 |
| 1000 | 0.6 |

EXAMPLE 6

A 20% wt/wt concentration of 90/10 mole % paraphenylene-/metaphenylene-terephthalamide random copolymer of inherent viscosity 2.2 gave a thin paste-like dope as prepared which could not be formed into homogeneous fibres. Left standing for 16 hours at 85° C. the paste had thickened so that the dope showed a yield stress of 10$^5$ N/m$^2$ and gave a friable extrudate. This thickened paste-like dope was subjected to various pre-shear rates before extrusion, as in Example 5, with the following results:

| Pre-shear Rate (sec$^{-1}$) | Pressure Drop through Die (N/m$^2$) | Apparent Viscosity (Ns/m$^2$) |
|---|---|---|
| 0 | 7.4 × 10$^6$ | 300 |
| 400 | 7.4 × 10$^6$ | 250 |
| 600 | 7.4 × 10$^6$ | 67 |
| 800 | 7.4 × 10$^6$ | 10 |
| 1000 | 7.4 × 10$^6$ | 3.2 |

An apparent pre-shear rate of at least 600 sec$^{-1}$ converts the dope from a friable paste into a free-flowing liquid.

A 15% wt/wt solution of this 90/10 random copolymer was liquid under all conditions. Its apparent viscosity at low extrusion pressure was little effected by subjecting it to pre-shear.

EXAMPLE 7

A sample dope of polymethyl methacrylate at 50% wt/wt concentration in methyl methacrylate was charged into the apparatus described in Example 2 at 60° C. The polymer had a relative viscosity of 8.2 (0.1% in Chloroform), a glass-rubber transition temperature of 100° C., an angular displacement from linearity of approximately 70°. The molecule of this polymer is highly sterically hindered.

The dope sample was extruded through the 2 mm diameter die to give a linear velocity of extrusion of 30 mm/second (apparent shear rate in the die of 120 sec$^{-1}$). In the absence of pre-shearing the extrusion pressure varied from $14 \times 10^6$ to $21 \times 10^6$ N/m$^2$ and the extrudate was mildly distorted. At a pre-shear rate of 500 sec$^{-1}$ the pressure dropped to $9.5 \times 10^6$ N/m$^2$ and the extrudate became very much smoother.

Other sample dopes of this polymer, 1.9 to 5.5 relative viscosities, were found to be readily extrudable as prepared and that the effect of pre-shear was minimal.

EXAMPLE 8

In this example a copolymer of p-acetoxybenzoic acid and polyethylene terephthalate prepared as described in Soc Plast Ind 30th Anniversary Tech Conf, 1975, section 17-D, page 1, under the name 'X7G', was used.

A sample 'A' of this polymer was charged into the barrel of the ram extruder used in Example 2 heated to a temperature of 234° C. The polymer was extruded, without application of a pre-shear (i.e. non-rotation of bob), at an apparent shear rate in the die of 50 sec$^{-1}$ to give an extrusion pressure of $2.5 \times 10^6$ N/m$^2$ giving extrudates which were highly fibrillar as described in the reference above.

When another sample 'B' was extruded at the same throughput, with zero pre-shear and a barrel temperature of 204° C., the extrusion pressure was $14.8 \times 10^6$ N/m$^2$ and the extrudate was substantially unoriented and brittle.

Other samples of the polymer were also extruded at the same throughput, a barrel temperature of 204° C., but at various pre-shear rates. For these samples the barrel temperature was no longer the extrusion temperature of the polymer; instead, because of viscous dissipation during pre-shearing the polymer temperature increased.

| Sample | Apparent Pre-shear Rate (sec$^{-1}$) | Polymer Melt Extrusion Temp. °C. | Extrusion Pressure (N/m$^2$) $\times 10^6$ |
| --- | --- | --- | --- |
| C | 31 | 208 | 5.5 |
| D | 62 | 212 | 3.8 |
| E | 125 | 216 | 1.8 |
| F | 250 | 223 | 1.0 |
| G | 500 | 232 | 0.7 |

The results of all the samples were plotted as shown in the accompanying drawing using extrusion pressure against melt extrusion temperature.

The dotted curve shows the fall in extrusion pressure as the polymer melt extrusion temperature rises, at a zero rate of pre-shear.

The full line curve shows the fall in extrusion pressure as the polymer melt extrusion temperature rises, at an increasing rate of pre-shear.

It can be seen that at a temperature of T° C., the effect of pre-shear in reducing the extrusion pressure is greater than the effect of temperature alone.

The sample D extrudate had a smooth skin but the body of the extrudate remains unoriented and brittle.

The samples F and G gave extrudates similar in appearance to that of Sample A.

The extrudates from the various samples had their melt flow rates measured at a temperature of 210° C. under a standard load of 2.16 kg using a standard die according to ASTM D1238-68:

| Sample | Melt Flow Rate (g/10 min) |
| --- | --- |
| A | 6.0 |
| B | 0.8 |
| C | 1.6 |
| D | 2.0 |
| E | 2.3 |
| F | 0.7 |
| G | 0.4 |

The melt flow rate of the extrudate of sample B was approximately an order of magnitude lower than that of the extrudate of sample A. This illustrated a physical change such that prolonged heating of the extrudate of sample A at 204° C. resulted in the melt flow rate of 0.08. Remelting and extruding the extrudate of sample B and extruding under the conditions used for sample A gave an extrudate with a melt flow rate of 0.60. Such changes could be effected repeatedly on the same sample indicating the purely physical nature of the changes. In the pre-sheared samples C, D and E with melt extrusion temperatures between 204° C. and 234° C., the melt flow rates of the respective extrudates were between those obtained for samples A and B. However, for samples F and G the extrudates had much lower values of melt flow rate. Indeed, the melt flow rate of the extrudate of sample G was half that of sample B. The physical nature of the changes was again demonstrated by remelting sample G at 260° C., followed by quenching ro room temperature and subsequently measuring the melt flow rate at 210° C. a value similar to that for sample A (in the table above) was obtained. By annealing sample A for a prolonged period at 190° C. and subsequently measuring the melt flow rate at 210° C. a value similar to that observed for sample B (in the table above) was obtained.

It is interesting to note that while the viscosity of the pre-sheared melt of sample G at 232° C. was approximately a factor of 4 lower than that of the non-presheared melt of sample A at 234° C. (comparing their respective extrusion pressures), the viscosity of the extrudate of sample G at 210° C. was approximately a factor of 15 greater than that of the extrudate of sample A at 210° C. (comparing their respective melt flow rates and noting that melt flow rate is a measure of fluidity which is the inverse of viscosity).

EXAMPLE 9

A further sample of X7G of slightly lower molecular weight than used in Example 8 was processed according to the conditions used for samples A, B and G of Example 9. The values obtained for these samples, coded Z, X and Y respectively, were similar to those obtained in Example 8 as shown in the table below.

| Sample | Pre-shear (sec$^{-1}$) | Extrusion Temperature (°C.) | Extrusion Pressure N/m$^2$ × 10$^6$ |
|---|---|---|---|
| X | 0 | 200° | 15.1 |
| Y | 500 | 225° | 0.6 |
| Z | 0 | 225° | 1.6 |

The extruded products were examined by broad line proton Nuclear Magnetic Resonance Spectrometry (NMR). Samples X and Z were very similar showing a doublet with a peak separation of approximately 14 KHz, when the internuclear vector is in the same direction as the applied field. By contrast sample Y showed a peak separation of ca 23 KHz. This, together with other evidence from the NMR scan, indicates that while X and Z are moderately oriented sample Y is strongly oriented with a high degree of uniformity of orientation, indicating a very homogeneous structure. This observation of extrudate homogeneity as a result of pre-shear was further qualitatively confirmed by electron microscope studies.

EXAMPLE 10

A polyester capable of exhibiting melt anisotropy was prepared by reacting 0.36 moles of chlorohydroquinone, 0.18 moles of terephthalic acid and 0.18 moles of ethylene-4,4'-dioxybenzoic acid according to the general disclosure of British Patent Specification No. 1 507 207. Using the apparatus hereinbefore described a sample H, of this polymer was extruded without pre-shear through a die 2 mm in diameter and 47 mm in length at a flow rate to give an apparent shear rate in the die of 500 sec$^{-1}$ at a temperature of 198° C. A further sample, I, was first subjected to a pre-shear of 500 sec$^{-1}$ at the same flow rate as for sample H (that giving an apparent shear rate in the die of 500 sec$^{-1}$). The temperature rose, because of viscous dissipation, to 234° C. A further sample, J, was extruded, without pre-shear, at an apparent shear rate in the die of 500 sec$^{-1}$ and at a temperature of 237° C. The extrusion pressures are recorded in the table below:

| Sample | Pre-shear (sec$^{-1}$) | Extrusion Temperature | Extrusion Pressure N/m$^2$ × 10$^6$ |
|---|---|---|---|
| H | 0 | 198° C. | 50 |
| I | 500 | 234° | 3.2 |
| J | 0 | 237° | 9.5 |

The figures indicate a reduction in extrusion pressure as a result of pre-shear. In a comparative experiment using a flow rate giving an apparent shear rate in the die of 50 sec$^{-1}$ (and consequently a relaxation time before extrusion of 60 seconds compared with 6 seconds with sample I) no benefit of pre-shear was observed other than that caused by the temperature rise of pre-shearing. This indicates that the longer relaxation period had allowed the melt to revert to the state it was in prior to pre-shearing.

COMPARATIVE EXAMPLE

The ineffectiveness of the invention when applied to rigid polymers which do not conform in their structural configuration to the requirements hereinbefore defined is illustrated by examination of high molecular weight polymers of a poly(aryl etherketone) having a repeat unit of formula

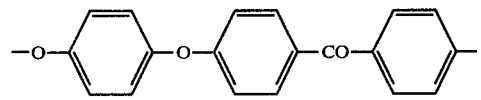

(hereinafter referred to as PEEK) and of a poly(aryl ethersulphone) having repeat units of formula

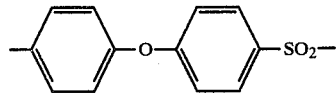

(hereinafter referred to as PES) respectively.

The PEEK was extruded at a backgroup temperature of 350° C. at an extrusion shear rate of 500 sec$^{-1}$ with and without a pre-shear of 500 sec$^{-1}$. The extrusion shear rate corresponds to a pre-shear time of 6 secs and a relaxation period of 6 secs. The pre-shearing caused the temperature to rise by 175° C. The extrudate showed no sign of fibrillar structure and the viscosity was only reduced by an amount which corresponded to the rise in temperature.

The PES was extruded at a shear rate of 30 sec$^{-1}$ (corresponding to a pre-shear time of 100 seconds and a relaxation period of 100 seconds. The PES was subjected to pre-shear rates of 0 to 500 sec$^{-1}$. Above pre-shear rates of 250 sec$^{-1}$ there was evidence that the PES had cross-linked. At pre-shear rates up to 125 sec$^{-1}$ there was no evidence of any reduction in viscosity other than that caused by the rise in temperature. There was no evidence of a fibrillar structure in the extrudate.

We claim:

1. A method of fabricating a shaped article from a rigid polymer comprising improving the processability of the rigid polymer by subjecting a melt or solution of the rigid polymer to shear between relatively moving surfaces at an apparent shear rate of at least 100 sec$^{-1}$, wherein the rigid polymer is in a thermotropic or lyotropic state, whereby the viscosity of the melt or solution is reduced and remains reduced after the shear between the relatively moving surfaces ceases to be applied, and fabricating a shaped article from the melt or solution while the viscosity is so reduced.

2. A method of fabricating a shaped article according to claim 1 wherein said rigid polymer is a thermotropic melt or lyotropic solution having an apparent viscosity of at least 1000 Ns/m$^2$ (Newton-seconds/square meter) as calculated from the rate of throughput through a capillary and the pressure required for such a throughput.

3. A method of fabricating a shaped article according to claim 1 wherein the rigid polymer is not in the form of a thermotropic melt or lyotropic solution prior to shearing but is caused to exhibit such thermotropic or lyotropic behavior as a result of the applied shear.

4. A method of fabricating a shaped article according to claim 3 wherein said rigid polymer is a thermotropic melt or lyotropic solution having an apparent viscosity of at least 1000 Ns/m$^2$ (Newton-seconds/square meter) as calculated from the rate of throughput through a capillary and the pressure required for such a throughput.

5. A method of fabricating a shaped article according to claim 3 wherein the rigid polymer is such that its chemical structure renders it incapable of exhibiting thermotropic or lyotropic behavior but which exhibits liquid crystal behavior when subjected to an apparent shear rate of at least 100 sec$^{-1}$.

6. A method of fabricating a shaped article according to claims 1, 2, 5, 3 or 4 wherein the rigid polymer has a formula:

in which:

X is an aromatic radical selected from the group of aromatic radicals having outgoing bonds which are either colinear or parallel, and A is either an atom or a group of atoms, and assumes a configuration wherein its outgoing bonds are either parallel or form an angle $\theta$ thus:

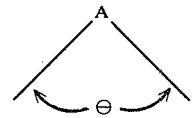

where $\theta$ is at least 120° and does not exceed 180°.

7. A method according to claim 6 wherein the rigid polymer is used in solution form, the rigid polymer having a glass transition temperature of at least 100° C. and an inherent viscosity as measured at 25° C. in a capillary viscometer of at least 1 dl/g (deciliter/gram).

8. A method according to claim 6 wherein the rigid polymer is used in melt form, the rigid polymer having a glass transition viscosity as measured at 25° C. in a capillary viscometer of at least 0.25 dl/g (deciliter/gram).

9. A method according to claim 6 wherein said polymer comprises poly(para-phenylene oxadiazole).

10. A method as in claim 6 wherein X is an aromatic radical, at least 70 mole percent being selected from the group of aromatic radicals having outgoing bonds which are either colinear or parallel and not greater than 30 mole percent being selected from the group of aromatic radicals having outgoing bonds which are neither colinear nor parallel.

11. A method of fabricating a shaped article according to claim 1 in which the shaped article is formed by extrusion of the viscosity-reduced melt or solution.

* * * * *